April 12, 1949.  D. E. KENYON  2,466,711
PULSE RADAR SYSTEM
Filed Jan. 18, 1944  3 Sheets-Sheet 1

INVENTOR
DAVID E. KENYON
BY
ATTORNEY

April 12, 1949.　　　　　　　D. E. KENYON　　　　　　2,466,711
PULSE RADAR SYSTEM
Filed Jan. 18, 1944　　　　　　　　　　　　　　　　3 Sheets-Sheet 2

INVENTOR
DAVID E. KENYON
BY Paul B. Hunter

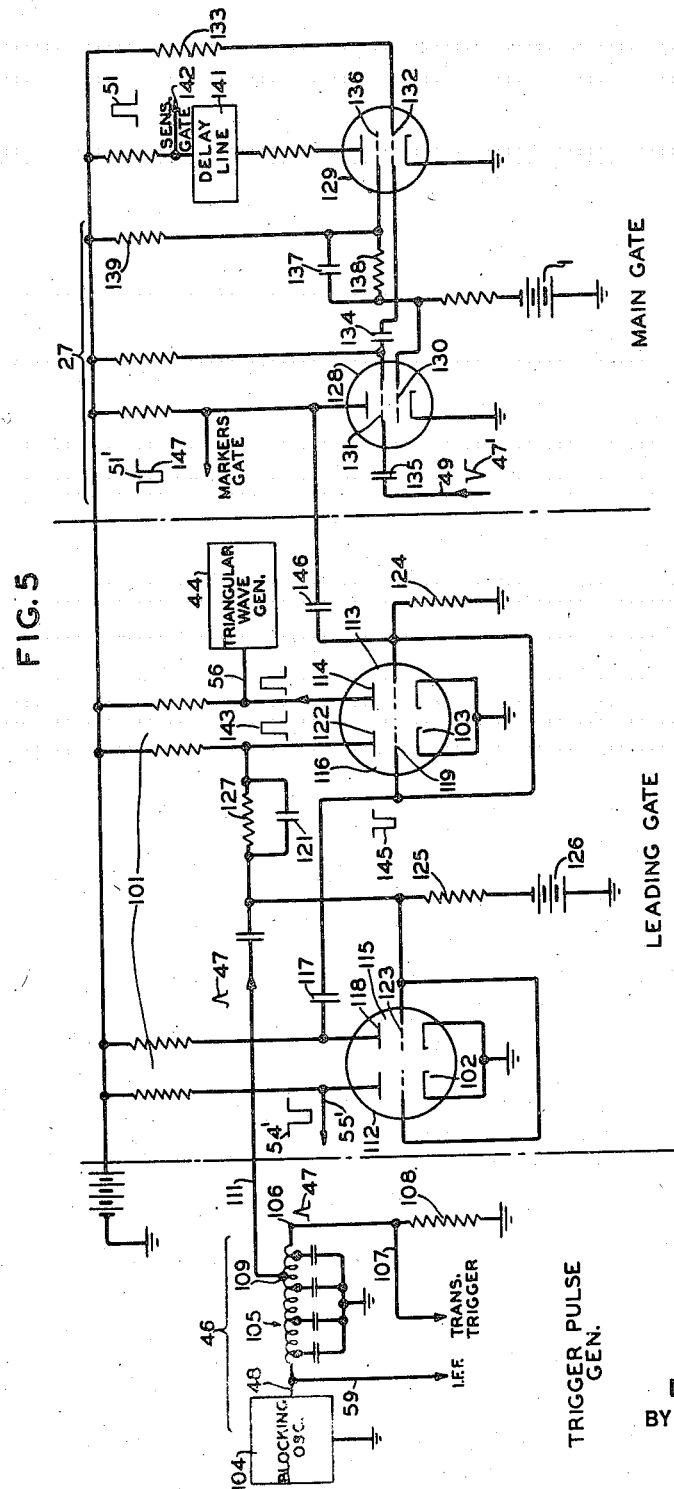

Patented Apr. 12, 1949

2,466,711

UNITED STATES PATENT OFFICE 2,466,711

PULSE RADAR SYSTEM

David E. Kenyon, Smithtown, N. Y., assignor to The Sperry Corporation, a corporation of Delaware Application January 18, 1944, Serial No. 518,678

7 Claims. (Cl. 343—13)

The present invention relates to radio locator systems or radar systems, particularly, such systems of the type producing indications on a screen.

An object of the invention is to provide an improved range indicator for object locating systems.

More specifically an object is to improve the linearity of range indications at short range.

Furthermore, it is an object of the invention to provide methods and apparatus for insuring the presence of the zero marker, as well as succeeding short range markers on the indicator screen.

In certain types of object locating apparatus, cathode ray tubes with fluorescent screens are employed as indicators. Graphic indications are produced on the fluorescent screen by the deflection of the cathode ray beam of the tube. Characteristic bright markers on the fluorescent screen are utilized instead of an external or printed scale for determining distances along an axis, usually the vertical or range axis. Such markers are produced by means of a marker generator acting upon the intensity of the cathode ray beam and producing bright markers on the screen at predetermined intervals corresponding to deflection of the beam along the axis in question. A square wave voltage or cathode ray gate voltage, as it is customarily called, is employed for energizing the cathode ray tube during the period of time that indications are expected to be produced. In order to sweep the beam along the vertical, or range axis, a triangular sweep wave generator is provided.

In the case of objects located at very short range so that only a short period of time elapses before indications are produced on the screen, difficulty may be encountered from the fact that the cathode ray gate voltage may not rise promptly to a sufficient value to energize the cathode ray tube and from the fact that the initial portion of the triangular current wave produced by the sweep wave generator is ordinarily not linear. In consequence, the zero marker may be lost and nonlinear indications of close ranges are produced.

It is accordingly an object of the invention to provide methods and apparatus for avoiding the loss of the zero range marker and the initial markers before the cathode ray tube has been sensitized, and it is an object to provide methods and apparatus for insuring linearity of the indication for short ranges.

An object of the invention is to insure that the cathode ray tube is in satisfactory condition to receive zero range markers and succeeding short range signals by delaying the marker impulses and video signals long enough for the cathode ray gate voltage to build up and for the vertical sweep to become linear.

Other and further objects and advantages will become apparent as the description proceeds.

In carrying out the invention in its preferred form a conventional type of radio locator apparatus may be employed, such as an azimuth sweep system, for example, employing a pulse transmitter, a suitable receiver including a video amplifier, and a cathode ray tube with horizontal and vertical sweep circuits and a control grid responsive to the output of the video amplifier in order to produce spots on the screen whenever a signal reflected from the detected object is received by the receiver. A conventional marker generator synchronized with the transmitted pulses may also be coupled to the grid of the cathode ray tube for producing range markers. In order to insure the presence of the zero range markers and to produce linearity of short range indications, the video signal and the marker input to the cathode ray tube are delayed by interposing a wide band delay line in the connection from the marker generator and the video amplifier to the cathode ray tube control grid.

A better understanding of the invention will be afforded by the following detailed description considered in conjunction with the accompanying drawings in which, Fig. 1 is a schematic and electric circuit diagram of one embodiment of my invention;

Fig. 5 is a fragmentary circuit diagram of an arrangement in which a leading gate is employed for producing the delay in the input to the control grid of the cathode ray tube.

Like reference characters are utilized throughout the drawing to designate like parts.

In microwave pulse type object locators, objects are detected by directing a series of pulses of microwave radiant energy in the direction in which the possible existence of an object is suspected and observing whether or not any pulses are returned, thus indicating the presence of an object serving to reflect the transmitted pulses. The apparatus for transmitting the microwave pulses and for receiving the reflected pulses is pivotally or rotatably mounted so as to scan an area which is to be patroned, or in which objects are to be located. The location of the object is then determined by determining the angular position of the scanner at the instant when the reflections are received. In locators of the azimuth-sweep (or ASD) type, the horizon is scanned and indications of azimuth and range of a detected object are produced upon the same screen.

For indicating the location, an indicator of the cathode ray tube type may be employed in which reflected pulses produce luminous marks on the screen and the cathode ray beam is swept across the screen both vertically and horizontally in order to scan the entire surface. The beam is swept horizontally across the screen in accordance with the sweeping or scanning motion of the scanner so that the positions on the screen of the indications of reflected signals serve as indications of the angular positions of the detected objects. The beam is also swept vertically along the screen to represent distance or range. In order that stray magnetic fields and the position of the apparatus with respect to the earth's magnetic field will not affect the scale calibration by virtue of magnetic action on the cathode ray beam, as well as for other reasons, electrically produced range marker indications are used on the scale instead of an external or permanently printed or engraved scale on the screen.

Figure 1:
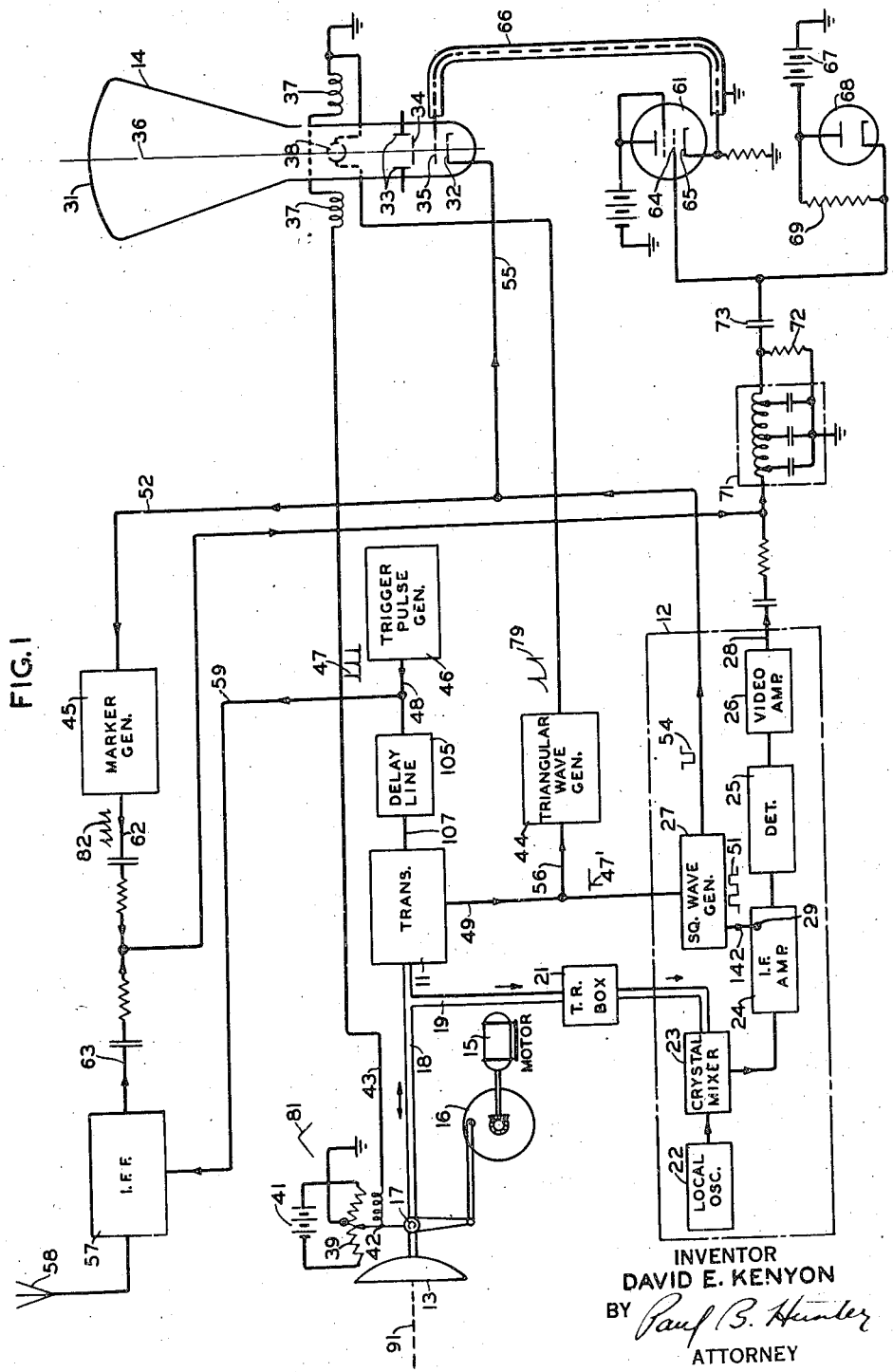

Such a system is represented schematically in Fig. 1 of the drawings, which includes a transmitter 11, a receiver 12, a common antenna or radiator 13 for the transmitter 11 and the receiver 12, and a suitable indicator such as a cathode ray oscilloscope 14 responsive to the receiver 12. For causing the scanner 13 to sweep back and forth along the horizon, a motor 15 may be mechanically connected through suitable gearing 16, to the radiator 13 shown in the form of a paraboloid pivotally secured to a pivot shaft or axis 17. The transmitter 11 is assumed to be of the ultra high frequency or microwave type and a suitable transmission line in the form of a hollow pipe wave guide 18 is interposed between the transmitter 11 and the parabolic radiator 13. The receiver 12 may be connected to the same radiator 13 through a branch wave guide 19. For damping out direct transmission from the transmitter 11 to the receiver 12, a suitable radiant-energy valve, blocking or power-limiting device 21 may be provided, which is herein referred to as a TR box. TR boxes are described in the copending applications of Eric J. Isbister, 509,061, filed November 5, 1943; Joseph Lyman et al., 406,494, filed August 12, 1941; Wilmer L. Barrow et al., 466,530, filed November 20, 1942, now Patent No. 2,454,761, issued November 30, 1948. Each of these applications shows a TR box comprising a cavity resonator containing an ionizable gas medium and employed as a coupling device between a receiver and a radar antenna to which a radar pulse transmitter is coupled. When weak signal energy reflected from a distant object is intercepted by the antenna, the gas is not ionized, and the resonator serves as an efficient high-Q coupling to the receiver for the intercepted energy. When a high-tensity pulse is applied to the antenna by the transmitter, on the other hand, the resonator is so strongly energized that the gas therein is ionized, with the result that the resonator Q is greatly diminished and the resonator serves as a very effective attenuator, so that the receiver is afforded protection against the strong pulses.

The receiver 12 may include conventional elements heretofore known, such as a local oscillator 22, a crystal mixer or first detector 23, an intermediate frequency amplifier 24, a second detector or video detector 25, and a video amplifier 26. For making the receiver responsive only during the period of time that reflected signals are expected to be received, a square wave generator 27, or gate generator, as it is sometimes called, is provided for supplying a voltage gate to the intermediate frequency amplifier 24. The intermediate frequency amplifier 24 is provided with a suitable control terminal or channel 29 which serves to control the amplification thereof.

In case the intermediate frequency amplifier 24 is of the type employing one or more stages of vacuum tubes, the terminal 29 may be one through which the screen grid or plate voltage supply is obtained by the intermediate frequency amplifier 24. The control of amplification by a supply of adjustable voltage to the screen grids or plate elements of vacuum tubes is not my invention per se and therefore the internal circuit of the intermediate frequency amplifier 24 need not be shown.

The cathode ray indicator tube 14 may be of a conventional type comprising a fluorescent screen 31, a cathode 32, anodes 33 for connection to a positive voltage source (not shown), focusing electrodes or anodes 34, and a control electrode or grid 35. For deflecting a cathode ray beam 36 emanating from the cathode 32 and impinging on the screen 31, suitable deflection elements are employed, such as deflecting plates or coils. In the arrangement illustrated, there is a pair of deflecting coils 37 for producing deflection of the beam 36 along a horizontal axis and there is a pair of deflection coils 38 for producing deflection of the beam 36 along a vertical axis. In the arrangement assumed, the horizontal axis represents azimuth and the vertical axis represents range. It will be understood, however, that my invention is not limited to the precise arrangement illustrated and described, nor is it limited to an arrangement in which indications are produced in azimuth instead of in elevation, or in which indications are produced in only one dimension instead of both azimuth and elevation.

For sweeping the beam 36 along the screen 31 as the radiator 13 moves in azimuth, a triangular voltage generator 39 may be provided. For the sake of illustration, the generator 39 is represented as comprising a potentiometer energized by a battery 41 and having a tap 42 mechanically connected to the radiator 13 and electrically connected through a conductor 43 to the azimuth deflection coils 37.

For sweeping the beam 36 in a vertical direction substantially linearly with the passage of time, a triangular or saw-tooth wave generator 44 of the electron tube type, for example, is connected to the vertical deflection coils 38.

Figure 2:
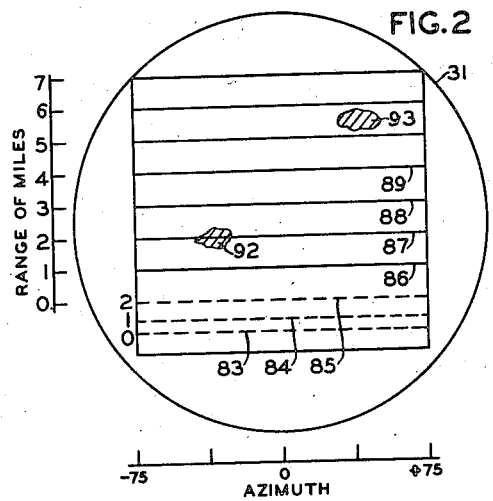
Fig. 2 is a diagram illustrating the appearance of the screen of the cathode ray tube and explaining the principle of operation of the invention.

For the purpose of providing an evenly spaced succession of sharp voltage pulses to the grid 35 of the cathode ray tube 14, a conventional marker generator 45 may be employed. A marker generator is a signal generator producing recurrent short output pulses at a repetition rate which ordinarily is a predetermined integral multiple of the cathode ray tube sweep frequency. For example, with a sweep frequency of 2,000 cycles per second, a desired number $n$ of range marker lines such as the horizontal lines illustrated in Fig. 2 may be produced on the screen of a cathode ray tube by the use of a marker generator adjusted to supply pulses at a repetition rate of 2,000 $n$ pulses per second.

For pulsing the transmitter 11 and causing the operation of the various elements of the system to be synchronized, a trigger pulse generator 46 is provided. The trigger pulse generator 46 may be arranged to produce a succession of short time duration voltage pulses or spikes 47, at the frequency at which it is desired to pulse the transmitter 11, for example, 2,000 spikes per second, in case a repetition rate of 2,000 pulses per second is desired for the transmitter 11. The trigger pulse generator 46 is coupled to the pulse controlling terminal of the transmitter 11 through a coupling or connection schematically indicated by a line 48 carrying an arrow indicating the fact that the transmitter 11 receives its control impulses from the trigger pulse generator 46. The other elements may also be coupled directly to the trigger pulse generator 46 for synchronization. Nevertheless, in object locating systems as manufactured, it has been found more convenient to provide a separate indicator trigger channel taken from the transmitter 11 represented by a line 49 in the drawing, and responsive to trigger pulses arriving through the channel 48. The channel 49 is directed toward the square wave generator 27 for controlling the instant of initiation of the square wave or sensitivity gating voltage 51 produced thereby.

The marker generator 45 may be synchronized from the output voltage 51 of the square wave generator 27 or the square wave generator 27 may be arranged to provide also an inverted square gating voltage 54 of negative polarity instead of positive polarity. The marker 45 may be synchronized therefrom through a channel 52. A schematically indicated connection 55 may be provided between the cathode 32 of the tube 14 and the output voltage 54 of the square wave generator 27, which thus serves as a cathode gating voltage.

Means may be provided also for synchronizing the triangular wave generator 44 from the trigger pulse generator 46, for example, through a branch channel 56 connected to the indicator-trigger channel 49.

In cases where it is necessary to be able to identify the object located, conventional I. F. F. (Identification Friend or Foe) apparatus 57 may be required, having an input antenna 58 and a triggering connection 59 from the trigger output channel 48 of trigger pulse generator 46. It is to be understood that such I. F. F. apparatus picks up a coded signal through its antenna 58 in case the object detected is a friendly ship or the like, for the purpose of superimposing an identifying coded indication on the screen 31 of the cathode ray tube 14 in order to avoid attacking such a friendly craft.

In order to avoid loading the video amplifier 26, the marker generator 45 and the I. F. F. apparatus 57, a video cathode follower stage including a vacuum tube 61 may be interposed in a connection from the elements 26, 45 and 57 to the control grid 35 of the tube 14. In the arrangement illustrated, the elements 26, 45 and 57 have output channels 28, 62 and 63, respectively, capacity coupled to an input connection such as a connection to a control electrode or grid 64 of the cathode follower tube 61. The tube 61 has a cathode 65 preferably connected through a cable 66 of the coaxial type to the cathode ray control grid 35.

For negatively biasing the cathode follower control grid 64, a source of negative voltage such as a "C" battery 67, is provided and to prevent depressing the grid 64 below the negative potential provided by the "C" battery 67, a direct-current restorer 68 is provided comprising a rectifier shunting a biasing resistor 69 with the cathode of the rectifier connected to the grid 64, and the anode connected to the negative terminal of the "C" battery 67.

In order to delay the application of the video, marker and I. F. F. signals to the grid 35 of the cathode ray tube 14, a wide band delay line 71, having a suitable delay such as 3 micro-seconds, e. g., is interposed in the coupling from the elements 26, 45 and 57 to the control grid 64 of the cathode follower tube 61. The delay line 71 is preferably of the wide band type in order to insure fidelity of transmission of the signals from the elements 26, 45 and 57 through it, but the invention is not limited to the use of a particular form of delay line, the same being schematically indicated in Fig. 1. The line 71 is preferably terminated by a resistor 72 having a resistance equal to the characteristic impedance of the line, and a blocking condenser 73 may be interposed between the output of the line and the grid 64.

In order to insure wide band characteristics, the line 71 may take the form of a delay cable, such as a cable of the type disclosed in the copending application of Gerald L. Tawney, Serial No. 474,400, filed February 1, 1943, now Patent No. 2,387,783, issued October 30, 1945, and assigned to the assignee of the present application, or such as disclosed by Kallman in the Proceedings of the Institute of Radio Engineers, July 1940, pages 306 and 307.

The cathode ray tube 14 is shown as being of the magnetic deflection type in which deflecting coils 37 and 38 are employed. It has been found that sweep wave circuits for producing the requisite gradually increasing current flow through the coils 38 have a current-time characteristic similar to that illustrated in Fig. 3.

Figure 3:
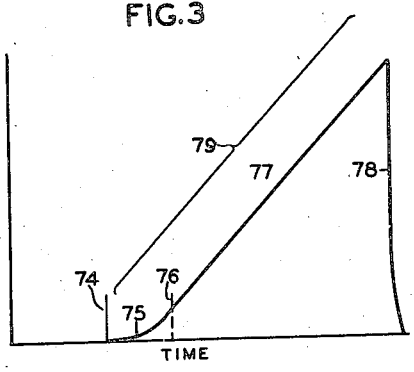
Fig. 3 is a graph illustrating the relationship between current and time in the sweep circuit including the vertical deflecting coils of the cathode ray tube.

In Fig. 3 values of current are plotted in the vertical direction and time duration measured in micro-seconds is plotted in a horizontal direction. Assuming that the trigger impulse from the channel 56 is applied at the time instant represented by the vertical line 74, the current provided by the triangular wave generator 44 is built up relatively gradually at an increasing rate as represented by the portion 75 of the curve until an instant of time represented by the vertical line 76 at which the current-time curve has become substantially linear and follows a relatively straight portion 77 of the graph, after which the sweep current falls abruptly along the portion 78 of the curve.

The cathode ray beam 36 of the tube 14 is deflected vertically as represented by the curve 79 of Fig. 3, also shown to reduced scale in Fig. 1. It is deflected horizontally substantially linearly in accordance with the curve 81 shown in Fig. 1. Accordingly, the position of the point at which the beam 36 impinges on the screen 31 represents the azimuth of an object reflecting the received signal and the time required for the reflection to be received, which latter represents the range in miles if the screen 31 is provided with range markers suitably calibrated to correspond to the vertical sweep curve 79, shown in Fig. 3. However, a linear scale calibration is most practicable and the marker generator 45 is so arranged as to produce evenly spaced marker impulses 82. Accordingly, if the tube 14 were sensitized with sufficient rapidity by the cathode ray gating voltage 54, a zero range marker 83, represented by dotted lines, would appear on the screen 31 shown in Fig. 2. Owing to the gradual rise along the portion 75 of the sweep curve 79, the next marker, for example, the one mile marker, would appear along the line represented in Fig. 2 by a dotted line 84, relatively close to the zero line 83. The next range marker would appear along the line 85 somewhat further spaced and the successive markers would be represented by bright lines 86, 87, 88 and 89 and so forth, which are evenly spaced as a result of the linear portion 77 of the curve 79 of Fig. 3. It will be observed therefore that the zero range marker 83 and perhaps also the one mile range marker 84, might not be obtained owing to the possible delay in build up of the cathode ray gating voltage 54 and the initial portion of the range scale of the screen 31 would not be linear if the delay line 71 of Fig. 1 were not employed.

However, when the delay line 71 is employed, the application of video signals to the grid 35 of the cathode ray tube 14 from the video amplifier 26, the marker 45, and the I. F. F. apparatus 57, is delayed sufficiently so that the zero range marker is produced and appears on a portion of the scale of the screen 31, corresponding to the linear portion 77 of the sweep wave 79 of Fig. 3. For example, the delay may be made such that the line 85 corresponds to the zero range marker and the successive evenly spaced lines 86, 87, 88, 89 and so forth, correspond to the successive ranges of 1, 2, 3, 4, miles and so forth. Thus, if objects should intercept the pulse microwave beam 91 at distances of 2 and 5½ miles, respectively, and at azimuth angles of approximately −30° and +45°, respectively, bright areas 92 and 93 will be produced on the screen 31 and the range of the close range object 92 may be read with the same degree of accuracy as the range of a more distant object 93.

Figure 4:
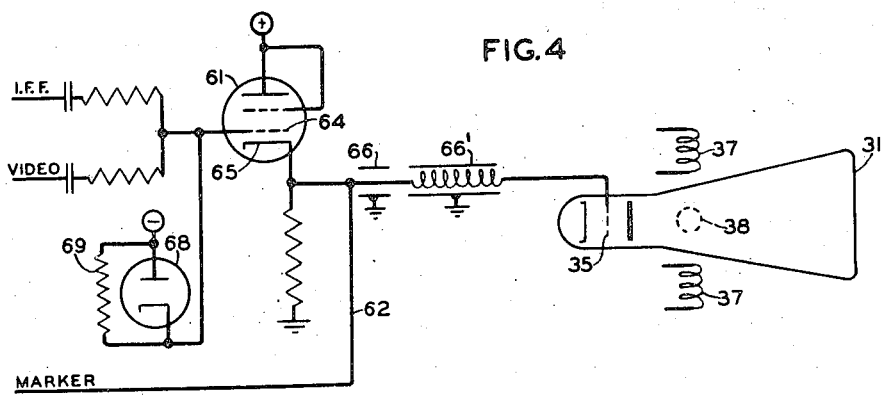
Fig. 4 is a fragmentary diagram of an embodiment of the invention in which a delay cable is employed.

In the arrangement of Fig. 1, the delay line 71 has been shown interposed before the grid 64 of the video cathode follower tube 61. It should be understood, however, that the invention is not limited to the precise arrangement illustrated. The requisite delay may be obtained by other means, for example, by substituting a delay cable 66' for the cable 66 shown in Fig. 1. As illustrated in Fig. 4, the delay cable 66' may be substituted for the cable 66 or may be interposed between the end of the cable 66 and the grid 35 of the cathode ray tube. In this case, the video and the I. F. F. inputs may be made directly to the grid 64 of the cathode follower tube 61, and, if desired, the marker output channel 62 may be connected to the input end of the cable 66 or 66'.

In order to obviate the expense of providing delay lines or delay cables in addition to those already employed in conventional radio locator apparatus, a leading gate circuit may be provided for producing the requisite delay in the application of video signals to the cathode ray tube. For example, as illustrated in Fig. 5, a leading gate circuit 101 may be provided, comprising a pair of tubes 102 and 103, shown as twin triodes, and the leading gate circuit 101 may be interposed between the main gate or square wave generator circuit 27 and the output of the trigger pulse generator 46.

As shown in detail in Fig. 5, the trigger pulse generator 46 may take the form of a blocking oscillator 104 having a delay line 105 interposed in its output channel 48. In the arrangement of Fig. 5, the end terminal 106 of the delay line 105 is connected to the transmitter trigger channel 107 and to a suitable terminating impedance 108; and the delay line is tapped, for example, at a point 109 with an output channel 111 connected to the input of the leading gate circuit 101. For example, in case a nine microsecond delay line 105 is employed, the tap 109 may be so positioned as to provide a delay of seven micro-seconds, thus giving a two microsecond lead to the triggering of the leading gate voltage of the leading gate generator 101.

The leading gate circuit 101 has a tube 102 split into two triode elements for the purpose of preventing the leading gate circuit from being loaded by the output connections. For example, there may be one triode unit 112 with an anode or output connection 55' for supplying a cathode-ray gating voltage 54'. Likewise, the twin tube 103 includes a triode unit 113 having an anode 114 with an output connection 56 for triggering the triangular wave generator 44. In order to avoid loading the triangular wave generator 44 and the cathode ray gate 54', the tubes 102 and 103 are provided with second twin triode units 115 and 116, respectively, which have cathodes and control grids with connections common to those of the units 112 and 113, respectively. The triode units 115 and 116 are cross connected in a manner analogous to an Eccles-Jordan trigger circuit. A coupling condenser 117 may be connected between the anode 118 of the unit 115 and the grid 119 of the unit 116, and a coupling condenser 121 may be connected between the anode 122 of the unit 116 and the grid 123 of the unit 115. The grids of the tube 103 are biased to ground through a resistor 124 in order that the tube 103 will be in a conducting condition. On the other hand, the grids of the tube 102 are negatively biased through a resistor 125 and a "C" battery 126; and the coupling condenser 121 is shunted by a voltage divider resistor 127 in order that the grids 123 of the tube 102 will normally be held below cut-off potential by the tube 103 so that the tube 102 is normally non-conductive.

The conventional main gate circuit 27 includes a pair of tubes 128 and 129 which may be of the multi-grid type. In order to avoid loading of one output circuit by another, the tube 128 includes a negatively biased control grid 130 and a second grid 131 with an anode output connection to the marker trigger channel 52. The tube 129 includes a control grid 132 positively biased through a resistor 133 and coupled through a condenser 134 to the second grid 131 of the tube 128, which is, in turn, coupled through a condenser 135 to the indicator trigger channel 49. The tube 129 also includes a second grid 136 which is coupled to the control grid 130 of the tube 128 by a condenser 137 shunted by a voltage-dividing resistor 138, the grid 136 being positively biased through a resistor 139. For eliminating from the receiver the direct transmitted pulse, a short delay line such as a 0.75 microsecond delay line 141 may be interposed in the anode load circuit of the tube 129, with a sensitivity gate connection 142 connected to the upper end of the delay line 141.

Figure 6:
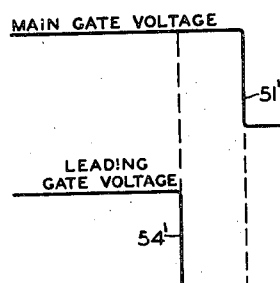
Fig. 6 is a graph explanatory of the principle of operation of the apparatus of Fig. 5.

The purpose of the leading gate circuit 101 is to provide the leading gate 54', shown in Fig. 6, which starts a requisite length of time such as 2 or 3 microseconds in advance of the leading edge of the main gate 51'. The arrangement is such that no time constants are required in the leading gate circuit 101, the circuit being tripped on by the trigger pulse generator 46 and tripped off by the end of the main gate voltage 51' produced by the main gate circuit 27.

Each time a trigger pulse is produced by the blocking oscillator 104, a trigger pulse 47 is applied to the I. F. F. apparatus 57 on the channel 59. After a 7 microsecond time delay (for the constants assumed by way of illustration) a trigger pulse is applied to the leading gate circuit 101 through the connection 111 and after a 9 microsecond time delay, the transmitter 11 is triggered by a pulse through the channel 107.

The pulse 47 applied through the channel 111, which is a positive pulse, raises the potential of the grid 123 of the tube 102 causing this tube to become conductive, thereby lowering the potential of the anodes producing the negative cathode ray gate 54', or sensitizing the cathode ray tube 14 and also depressing the potential of the grid 119 of the tube 103 as represented by the negative square wave 145. The tube 103 is accordingly driven non-conductive and the anodes rise in voltage abruptly producing the leading gate 143 at the anode 122 which holds the control grid 123 of the tube 102 positive, even after the trigger 47 from the trigger pulse generator 46 has disappeared. At the same time, the tube 113 triggers the triangular wave generator 44, two microseconds after the leading gate circuit 101 has been triggered; an indicator trigger 47' received through the transmitter 11 and the channel 49 triggers the tube 129 causing it to become non-conducting and its anode voltage abruptly rises producing the delayed sensitivity gate 51. The anode voltage of the tube 128 has the wave shape 51', shown in Fig. 6. The tube 129 remains non-conducting for a period of time predetermined by the time constant of the resistor 133 and the condenser 134, whereupon the tube 129 again becomes conducting, lowering the potential of the electrode 136, and consequently, negatively biasing the control grid 130 of tube 128, rendering the tube 128 non-conducting. The negative marker gate 51' is produced by the anode of the tube 128.

For shutting off the leading gate circuit 101, a coupling condenser 146 is connected between the anode of the tube 128 and the control grid 119 of the leading gate tube 103. When the voltage rises at the trailing edge 147 of the negative marker gate 51' and the grids 119 of the tube 103 are raised in potential, the tube again becomes conducting, driving the tube 102 non-conducting and restoring all the tubes of the circuits 101 and 27 to their original condition. Thus it appears that the leading gate circuit 101 requires no timing elements and is automatically restored to its original condition by the trailing end 147 of the main gate voltage 51' produced by the main gate circuit 27.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An object locating system comprising in combination a transmitter for projecting radiant energy in pulses, a receiver responsive to reflections of such projected radiant energy, and an oscilloscope having a range sweep and a beam control element, said receiver including a video amplifier coupled to said beam control element, a range marker impulse generator also coupled to said beam control element, means for synchronizing the pulses produced by the transmitter with the range sweep and the range marker impulse generator, and a delay circuit interposed in advance of said beam control element to delay the video input thereto for enabling the sweep to become linear before the received signals are applied to the oscilloscope.

2. In a receiving apparatus for a micro-wave object locating system having a recurrent pulse transmitter, in combination, an oscilloscope having a deflectable beam and a beam-control element, means for sweeping said beam in synchronism with said pulse transmitter, a video amplifier and a range marker signal generator adapted to supply received signals and marker signals to said beam control element, and a delay circuit connected from said video amplifier and said marker generator to said beam control element to delay the application of video signals to said oscilloscope.

3. In combination, a transmitter adapted to transmit high-frequency energy of recurrently varying intensity, a receiver responsive thereto, a deflectible beam device having a beam-intensity control grid, saw-tooth wave generating means for deflecting the beam of said device substantially linearly in synchronism with the recurrent intensity variations of said transmitter, said receiver having a video output coupled to said beam-intensity control grid, and delay means interposed in said coupling to delay said video output to said beam-intensity control element until after the initiation of the beam deflecting means.

4. In combination, a transmitter pulsing radiant energy, a receiver responsive thereto for producing receiver signal output, a deflectible beam device having a beam-control element, a sweep circuit therefor supplying a linear sweep wave in synchronism with pulse transmission from said transmitter, means supplying receiver signal output to said beam-control element, and means for relatively advancing the sweep-wave and retarding said signal output supplied to said control element.

5. In a pulse radio object detection system, in combination, means for periodically initiating signal pulses, means coupled to said pulse-initiating means for transmitting toward a distant object radiant energy pulses synchronous with said initiated pulses, means for reproducing a variably delayed version of said initiated pulses comprising a receiver for detecting radiant energy pulses reflected from said distant object, an oscilloscope having a beam deflection circuit and a signal input circuit, means coupled to said beam deflection circuit and synchronized with said pulse initiating means for producing recurrent beam deflections in said oscilloscope, means coupling said reproducing means to said oscilloscope signal input circuit for delivering thereto a variably delayed version of said initiated pulses and producing on said oscilloscope a pattern representing said variably delayed version of said initiated pulses, and means for introducing a predetermined further delay between initiation of said pulses and delivery of said variably delayed version thereof to said oscilloscope signal input circuit.

6. A system as defined in claim 5, wherein said last-named means comprises a leading gate generator, a main gate generator having a coupling for gating said receiver, said pulse initiating means having a delayed output, said gate generators being triggered by said pulse initiating means with the triggering of said leading gate generator relatively in advance with respect to the triggering of said main gate generator, and said transmitter being triggered by said trigger pulse generator relatively in retardment with respect to the triggering of said leading gate generator, and a coupling from said leading gate generator to said beam deflection producing means for synchronizing said beam deflection means with said pulse initiating means.

7. A system as defined in claim 5, wherein said last-named means comprises a leading gate generator having a coupling to said oscilloscope for controlling the operation thereof, a main gate generator for triggering said receiver, said signal pulse initiating means including means for triggering said leading and main gate generators, means for delaying the output of said signal pulse initiating means, said leading gate generator being triggered relatively in advance with respect to the triggering of said main gate generator and said transmitter, and said leading gate generator including means for synchronizing said beam deflection producing means with said signal pulse initiating means, and a coupling from said main gate generator to said leading gate generator for controlling the operation of said leading gate generator.

DAVID E. KENYON.

REFERENCES CITED

The following references are of record in the file of this patent:

UNITED STATES PATENTS

| Number | Name | Date |
|---|---|---|
| 2,158,285 | Koch | May 16, 1939 |
| 2,189,549 | Hershberger | Feb. 6, 1940 |
| 2,227,598 | Lyman et al. | Jan. 7, 1941 |
| 2,280,531 | Norgaard | Apr. 21, 1942 |
| 2,285,043 | Messner | June 2, 1942 |
| 2,345,932 | Gould | Apr. 4, 1944 |